United States Patent
Hoffmann et al.

(10) Patent No.: US 12,500,306 B2
(45) Date of Patent: Dec. 16, 2025

(54) REDUCTION OF HIGH-VOLTAGE INTERFERENCES IN A BATTERY SYSTEM FOR ELECTRIC VEHICLES

(71) Applicant: Webasto SE, Stockdorf (DE)

(72) Inventors: Detlef Hoffmann, Stockdorf (DE); Patrick Assmann, Stockdorf (DE); Mario Meyer, Stockdorf (DE)

(73) Assignee: Webasto SE, Stockdorf (DE)

( * ) Notice: Subject to any disclaimer, the term of this patent is extended or adjusted under 35 U.S.C. 154(b) by 633 days.

(21) Appl. No.: 17/631,197

(22) PCT Filed: Jul. 31, 2019

(86) PCT No.: PCT/EP2019/070699
§ 371 (c)(1),
(2) Date: Jan. 28, 2022

(87) PCT Pub. No.: WO2021/018398
PCT Pub. Date: Feb. 4, 2021

(65) Prior Publication Data
US 2022/0263175 A1    Aug. 18, 2022

(51) Int. Cl.
*H01M 50/24*    (2021.01)
*B60K 6/28*    (2007.10)
(Continued)

(52) U.S. Cl.
CPC ............ *H01M 50/24* (2021.01); *B60L 50/64* (2019.02); *H01M 50/204* (2021.01); *B60K 6/28* (2013.01);
(Continued)

(58) Field of Classification Search
CPC ............... H01M 50/24; H01M 50/204; H01M 2220/20; B60L 50/64; B60K 6/28; B60Y 2200/91; B60Y 2200/92; B60Y 2400/112
See application file for complete search history.

(56) References Cited

U.S. PATENT DOCUMENTS

| 4,884,171 A * | 11/1989 | Maserang ............ H05K 9/0049 |
| | | 361/679.01 |
| 2003/0047336 A1* | 3/2003 | Takami ................ H05K 9/0052 |
| | | 174/363 |

(Continued)

FOREIGN PATENT DOCUMENTS

| EP | 2698861 A1 | 2/2014 |
| EP | 3293791 A1 | 3/2018 |

(Continued)

OTHER PUBLICATIONS

International Search Report for PCT/EP2019/070699 mailed Apr. 14, 2020.

*Primary Examiner* — Matthew T Martin
*Assistant Examiner* — Taylor Harrison Krone
(74) *Attorney, Agent, or Firm* — Command IP LLP; Michael Zarrabian

(57) ABSTRACT

Battery system, preferably for a hybrid or electric vehicle, wherein the battery system comprises: one or more battery packs each having one or more cells which are electrically connected and configured to provide a voltage, preferably a high voltage, at a respective battery pack output; and an integration device electrically connected to the battery pack outputs and configured to receive and combine the power of the battery packs, thereby forming a sum power supplied to a sum voltage output of the integration device; where in the integration device comprises a filter device which is configured to protect the battery packs from interferences, for example interferences generated by an electrical component connected to the sum voltage output.

14 Claims, 2 Drawing Sheets

(51) Int. Cl.
*B60L 50/64* (2019.01)
*H01M 50/204* (2021.01)

(52) U.S. Cl.
CPC ....... *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | |
|---|---|---|
| 2008/0050645 A1 | 2/2008 | Kai et al. |
| 2015/0077964 A1 | 3/2015 | Lim et al. |
| 2019/0148876 A1* | 5/2019 | Milroy ................. H01R 13/523 439/522 |
| 2021/0129684 A1* | 5/2021 | Wuensche ......... H01M 10/6557 |

FOREIGN PATENT DOCUMENTS

| | | | | |
|---|---|---|---|---|
| KR | 20180074853 | * | 7/2018 | ......... B60Y 2200/91 |
| WO | WO-2018128295 A1 | * | 7/2018 | ............. B60L 50/60 |

* cited by examiner

REDUCTION OF HIGH-VOLTAGE INTERFERENCES IN A BATTERY SYSTEM FOR ELECTRIC VEHICLES

CROSS-REFERENCE TO RELATED APPLICATIONS

This application is a 35 U.S.C. § 371 National Stage Entry of International Application No. PCT/EP2019/070699 filed Jul. 31, 2019, which is incorporated herein by reference in its entirety for all purposes.

TECHNICAL FIELD

The invention relates to a battery system, preferably used in hybrid or electric vehicles. The battery system comprises a battery pack having cells which are electrically connected and configured to provide a voltage, preferably a high voltage.

BACKGROUND

Due to switching operations of consumers in a high-voltage network of electric vehicles, interference currents of high frequency may be introduced into the battery system of the drive train via shielded high-voltage lines. The interference currents may directly couple into low-voltage cables via busbars, usually unshielded, inside the battery. This coupling leads to an increase of the interference emission at the low-voltage power supply of the vehicle. Furthermore, data transmission within the battery system may be disturbed, thereby causing delays regarding the cell monitoring or malfunctions of the battery management controller.

High-voltage interference filters are known and used in order to avoid that high-frequency interference currents enter the battery. The high-voltage interference filters are adapted to the specific application in terms of design, electrical parameters and filter effect. Filters are usually either integrated directly into the inverter or installed at the respective high-voltage interface of the battery pack. A filter may as well be placed at the inlet of the high-voltage line into the respective component, and the input and output lines of the filter are decoupled by the shielding of the components.

The EP 2 698 861 A1 describes a high-voltage battery for a motor vehicle, which includes cells and a system for controlling and monitoring the cells. A capacitor is provided between the positive and the negative of the high-voltage lines. The DE 10 2016 206 464 A1 describes a shielding system for a high-voltage component in a vehicle. The shielding system comprises suppression capacitors installed at a high-voltage line connecting a battery pack and an inverter.

In vehicles comprising several battery packs, particularly regarding many commercial vehicles, the number of filters, the filter costs and the required installation space increase in accordance with the number of battery packs. This implies that a vehicle-specific adaptation of the filters requires modifications of the respective battery packs. Safety requirements such as a high insulation resistance and limited energy of the Cy-capacitors are more difficult to meet the more battery packs are installed and equipped with high-voltage EMC-filters each containing Cy-capacitors.

SUMMARY OF THE INVENTION

It is an object of the present invention to provide an improved battery system, preferably for a hybrid or electric vehicle, particularly having a compact and flexible design.

The object is solved by a battery system defined in claim 1. Preferred embodiments are defined in the dependent claims, the general description of the invention as well as the description of specific embodiments and the drawings.

The battery system is preferably used in hybrid or electric vehicles, particularly for supplying power to a drive train thereof. Thus, the battery system preferably provides high-voltages.

The battery system according to the invention comprises one or more battery packs, preferably a plurality of battery packs, each having one or more cells, preferably a plurality of cells, which are electrically connected and configured to provide a voltage at a respective battery pack output. The battery system further comprises an integration device electrically connected to the battery pack outputs and configured to receive and combine the power (including voltage and/or current) of the battery packs, thereby forming a sum power supplied to a sum voltage output of the integration device. The integration device comprises a filter device which is configured to protect the battery packs from interferences, such as generated by an electrical component, for instance a power converter and/or a charging device and/or a thermal conditioner and/or high-voltage load, connected to the sum voltage output.

The charging device may be provided for charging or conditioning the cells of the battery system. The thermal conditioner may be provided in form of an electrical heater and/or a cooling device such as an air conditioning system for heating or cooling the passenger cabin of the vehicle. The thermal conditioner may also be provided for heating or cooling the battery cells in the battery modules of the battery system.

The filter device may protect the battery packs from interferences stemming from the actual switching of the electrical components mentioned before and/or from operation of the electrical components.

Arranging a filter device within the integration device increases the flexibility of the battery system, because battery packs can be easily added or removed without the need to individually equip the battery packs with filter or shielding devices and adjust the electrical properties thereof. It is not necessary to individually equip the battery packs with filters; thus, protection can be achieved by using less filter devices per battery system. This implies a reduction of installation space, number of components and costs. Further, the battery system is easily adaptable to different types of vehicles and characteristics.

Preferably, the battery packs are free from filters, preferably free from high-voltage EMC-filters. In other words, the battery packs do not carry individual filters and in particularly not individual EMC filters.

Preferably, no filter device is arranged within or assigned to one or more, preferably all, of the battery packs. As indicated above, sufficient protection can be achieved by using less or even only one filter device per battery system, preferably per vehicle, at a central location implemented by the integration device. This implies a further reduction of installation space, number of components and costs.

The positioning of the filter device at a central location takes advantage of the fact that costs and installation space for such filters, for instance high-voltage EMC-filters, increase only slightly with current and voltage. This implies that according to a particularly preferred arrangement, only one filter device is required in the sum voltage/current path whose installation space and costs differ insignificantly from a single filter in a battery pack.

Preferably, the filter device comprises an EMC-filter, in particular a high-voltage EMC-filter, and a metallic shielding plate configured to shield electromagnetic fields. The shielding plate implements protection zones within the integration device, which ensures a high effectiveness of the EMC-filter. Moreover, the shielding plate helps improving the performance of the EMC-filter particularly in cases where the installation space within the integration device is very limited.

The EMC-filter preferably comprises at least one filter input configured to receive the sum power and at least one filter output connected to the sum voltage output, and the shielding plate preferably comprises a filter bridging portion bridging the EMC-filter between the filter input and the filter output. In other words, the space around the filter input and the space around the filter output are separated and electromagnetically decoupled in order to particularly shield at the filter input and reduce overcoupling to the filter output. The shielding plate may further comprise a distant portion, preferably U-shaped, which is configured to take further shielding and/or installation functions.

Preferably, the filter bridging portion comprises a cutout for receiving or accommodating the EMC-filter. Thus, the filter device comprising the EMC-filter and the shielding plate is particularly compact and suitable for installation even in integration devices of limited space.

Preferably, the shielding plate is cut from one piece of a sheet metal, thereby simplifying the manufacturing thereof and reducing components and costs. The thickness of the sheet metal, thus the shielding plate as well, may be in the range of 2 mm to 4 mm, preferably approximately 3 mm, in order to enhance the attenuation effect at low frequencies. The final shape thereof may be achieved by mechanical forming sheet metal, such as bending, thermoforming, drawing, cutting etc.

Preferably, the integration device comprises a housing, denoted as "integration device housing", and the shielding plate is mechanically connected to a part of the integration device housing, preferably to a base thereof, thereby optimizing the performance of the filter device.

In order to strongly decouple the filter inlet and outlet, a possible gap created when attaching the shielding plate should be as small as possible. If joints or gaps at the shielding plate, for instance to the integration device housing or the EMC-filter, are unavoidable for reasons of tolerance, they are preferably closed by one or more conductive seals which establish an electrical connection between the shielding plate and the corresponding parts, e.g. walls, base and/or cover of the integration device housing. Preferably, the conductive seal is fitted or attached to the shielding plate and configured to compensate for mechanical tolerances. For the same reason, the conductive seal is preferably made of a flexible material.

The integration device may comprise further electrical components, such as sensor(s), a low-voltage power supply and/or HV-IL lines, which should be arranged such that crosstalk to the lines or cables on the battery side is minimized. In addition, any sensor technology having supply line(s) for instance to a BMC (Battery Management Control) is preferably restricted to the consumer side, i.e. not the battery side. This avoids interferences from the consumer side to the battery side. If filtering of low-voltages and for instance sensor cables is necessary due to high interference levels of the loads, a filter or shielding device can be effectively applied at the passage of the cables through the shielding plate and thus connected at low inductance to the housing potential.

If the installation space in the integration device is strongly limited, the input and output lines of the EMC-filter are located in close proximity to each other. For instance, if a busbar arrangement is used, the lines usually generate conductor loops due to requirements regarding air and leakage/creeping paths as well as switching and safety elements. These conductor loops are present between the plus and minus busbars but also between the busbars and the integration device housing. On the side of consumer and/or charging devices, the conductor loops may cover space in the range of several 10 $cm^2$, for instance due to the dimensions of high-voltage connections, electrical fuse elements and/or high-voltage switching relays. These conductor loops couple via magnetic near fields into the battery-side connection lines in the integration device. This coupling tends to bridge the high-voltage EMC-filter, especially at higher frequencies. The metallic shielding plate, its configuration and arrangement within the integration device helps avoiding that the EMC-filter loses its interference suppression effect, even if the installation space is strongly limited. In order to further improve the filter performance, any conductor loop(s) at the filter output may be minimized as this reduces the inductive coupling into it.

Preferably, an electrical component is electrically connected to the to the sum voltage output of the integration device, wherein the electrical component preferably comprises a power converter, such as an inverter, and/or a high-voltage load and/or charging device. In the case of hybrid or electric motor vehicles, the voltage of the battery system is transferred to a power converter before it can be supplied to the consumers. The power converter converts a direct current provided by the battery system into an alternating current. This transformation is a major cause of interference signals which are effectively suppressed and shielded by the filter device.

The above mentioned object is furthermore solved by means of a battery pack with the features of claim 12. The further embodiments relating to the battery pack as mentioned above in connection with the battery system also apply to the battery pack alone.

Accordingly, the battery pack has one or more cells which are electrically connected and configured to provide a voltage, preferably a high voltage, at a respective battery pack output, wherein no filter, preferably no high-voltage EMC-filters, is included or individually assigned.

By this embodiment, an efficient setup of a battery system is possible while using cost and space effective battery packs.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
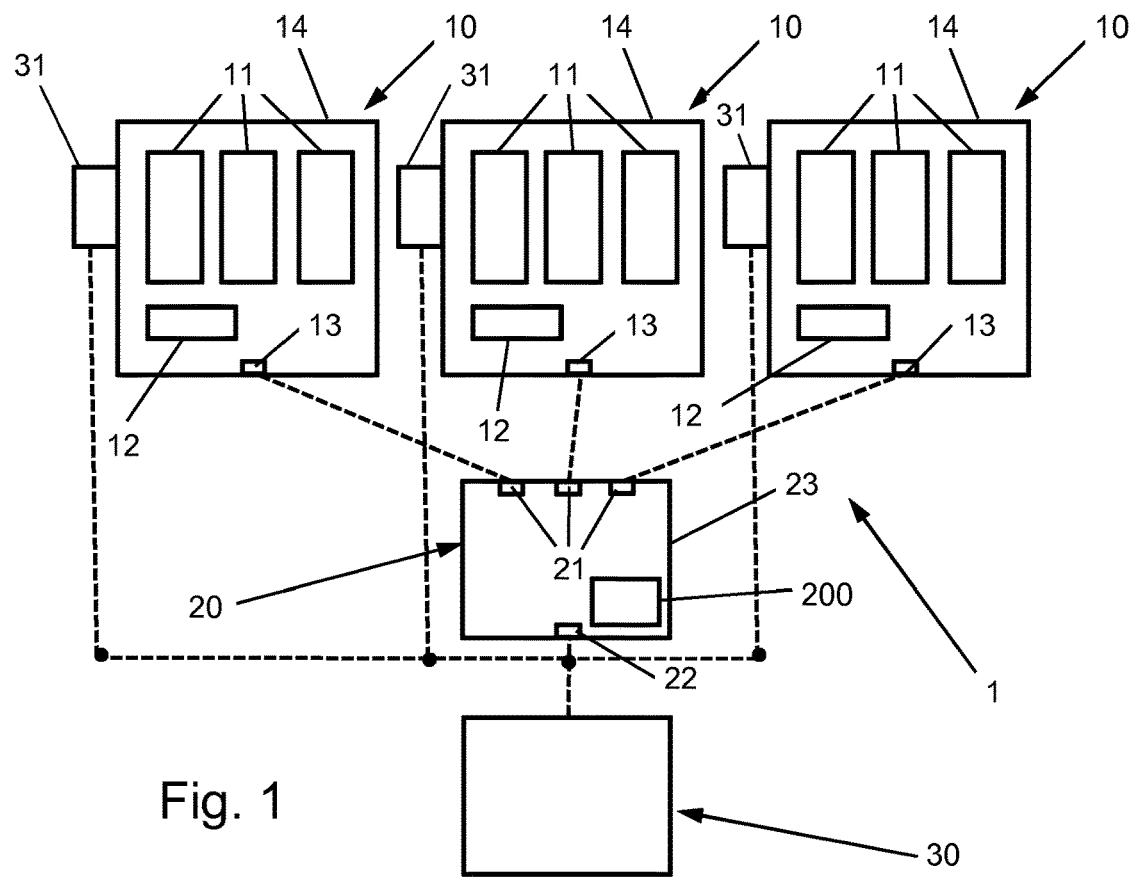
FIG. 1 schematically illustrates a battery system comprising a plurality of battery packs and an integration device having a filter device.

In the following, the invention will be explained in more detail with reference to the accompanying drawings. In the drawings, like elements are denoted by identical reference numerals and repeated description thereof may be omitted in order to avoid redundancies.

FIG. 1 schematically illustrates a battery system 1, preferably a high-voltage battery system, comprising at least one battery pack 10, preferably a plurality of battery packs 10, and an integration device 20, also denoted as "Vehicle Integration Box" (VIB). The battery packs 20 are electrically and centrally connected to the integration device 20.

Each battery pack 10 comprises at least one cell 11, preferably a plurality of cells 11, which are connected in series and provide a respective voltage. Each battery pack 10 may be equipped with a battery pack control unit 12 for controlling and monitoring the cells 11. Each battery pack 10 further comprises a battery pack output 13 which provides the combined voltage or power generated by all cells 11 of the respective battery pack 10. The cells 11, the battery pack control unit 12 and possible further components of the battery pack 10 are accommodated in a battery pack housing 14.

The power provided by the battery pack outputs 13 of all battery packs 10 is supplied to corresponding voltage inputs 21 of the integration device 20. In other words, the integration device 20 implements a central location for collecting and combining the power or voltages of the battery packs 10, thereby forming a sum current path or sum voltage path. The integration device 20 comprises a sum voltage output 22 which provides the combined power, i.e. voltage and current, generated by all battery packs 10.

The sum voltage output 22 is connected to an electrical component 30, such as an inverter and/or high-voltage load and/or charging device and/or thermal conditioner such as an electrical heater or air-conditioner for thermally conditioning the passenger cell of the vehicle.

The voltage output 22 may also be connected to an electrical component in form of a thermal conditioner 31 located at the battery packs 10 in order to thermally condition the cells in the battery packs 10. The thermal conditioner 31 may be provided in form of an electrical heater for heating the cells and/or an electrical cooling unit for cooling the cells in order to ensure that the cells are operated under preferred thermal conditions such that improved electrical performance can be achieved.

The integration device 20 comprises a filter device 200 which is configured to protect all connected battery packs 10 from interferences for instance generated by the component 30. The filter device 200 and possible further components of the integration device 20 are accommodated in an integration device housing 23.

Preferably, one or more, preferably all, of the individual battery packs 10 are free from filters more preferably the battery packs 10 are free at least from high-voltage EMC-filters.

In other words, the battery packs 10 are preferably not individually equipped with filters, preferably not individually equipped with high-voltage EMC-filters; thus, in this case protection is achieved by using only one filter device 200 per battery system 1, preferably per vehicle, at the central location implemented by the integration device 20.

The positioning of the filter device 200 at the central location of the integration device 20 takes advantage of the fact that costs and installation space for such filters, particularly high-voltage EMC-filters, increase only slightly with current and voltage. This implies that only one filter device 200 is required in the sum current/power path whose installation space and costs differ insignificantly from a single filter in a battery pack 10.

Figure 2A:
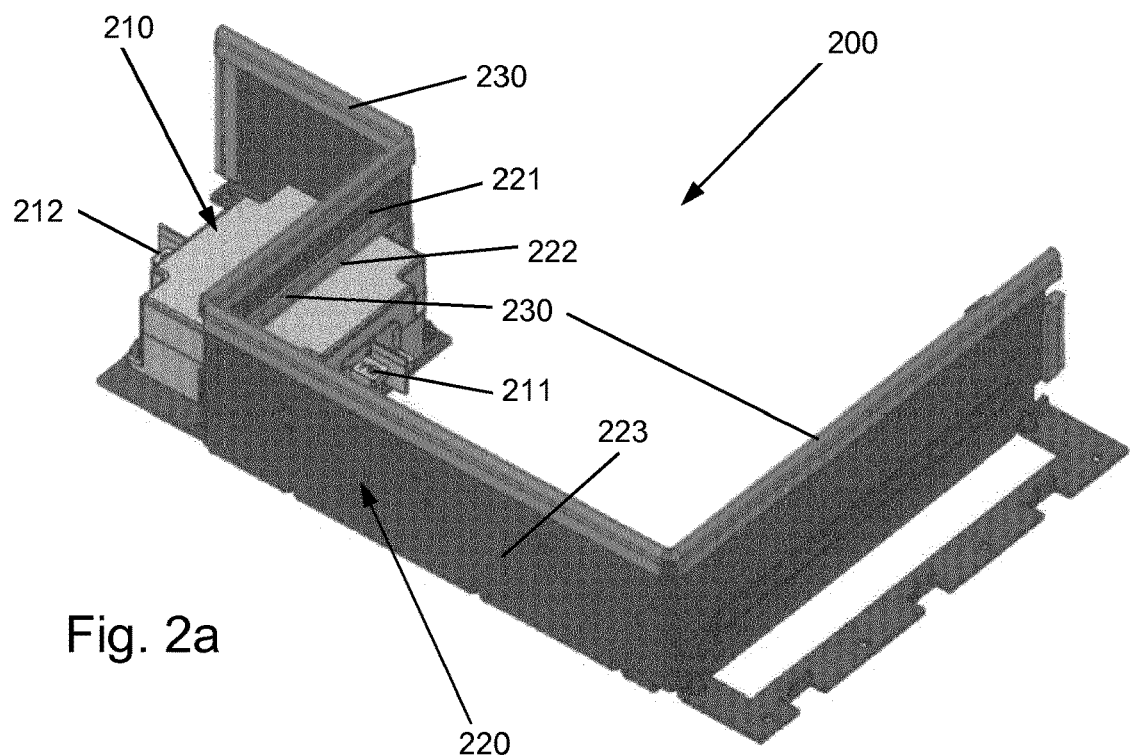
FIG. 2a is a perspective view schematically illustrating an embodiment of the filter device comprising a high-voltage EMC-filter and a metallic shielding plate.
Figure 2B:
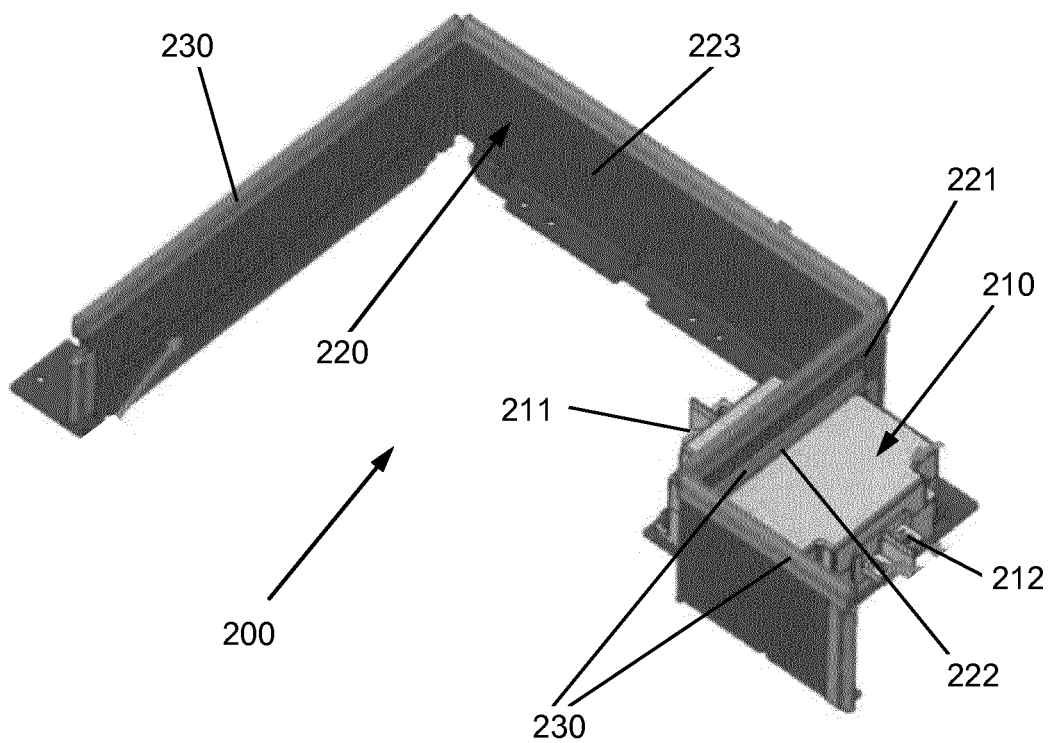
FIG. 2b illustrates the filter device of FIG. 2a at a different viewing angle.

FIGS. 2a and 2b are perspective views schematically illustrating an embodiment of the filter device 200. In this preferred implementation, the filter device 200 comprises a high-voltage EMC-filter 210 and a metallic shielding plate 220. The metallic shielding plate 220 is configured to shield electromagnetic fields.

The EMC-filter 210 comprises at least one filter input 211 and at least one filter output 212. The filter input 211 and/or the filter output 212 may be connected to a busbar. Preferably, the shielding plate 220 comprises a filter bridging portion 221 having a cutout 222 for accommodating or receiving the EMC-filter 210. The filter bridging portion bridges the EMC-filter 210 between the filter input 211 and the filter output 212 in order to particularly shield at the filter input 211 and reduce overcoupling to the filter output 212. The shielding plate 220 may further comprise a distant portion 223, preferably U-shaped, which is configured to take further shielding and/or installation functions.

Preferably, the shielding plate 220 is cut from one piece of a sheet metal. The thickness of the sheet metal may be in the range of 2 mm to 4 mm, preferably approximately 3 mm, in order to enhance the attenuation effect at low frequencies. The final shape thereof may be achieved by mechanical forming such as bending, thermoforming or drawing.

The shielding plate 220 is firmly connected to a part of the integration device housing 23, preferably to a base thereof. In order to decouple the filter inlet 211 and filter outlet 212, a possible gap created when attaching the shielding plate should be as small as possible. If joints or gaps for instance to the integration device housing 23 are unavoidable for reasons of tolerance, they are preferably closed by one or more conductive seals 230 which establish an electrical connection between the shielding plate 220 and the corresponding parts, e.g. walls, base and/or cover of the integration device housing 23. Preferably, the conductive seals 230 are fitted to or applied to the shielding plate 220 and are configured to compensate for mechanical tolerances.

Further possible electrical components, such as a sensor, low-voltage power supply, HV-IL lines etc., are preferably positioned with minimum loop height at parts of the integration device housing 23 or the shielding plate 220 in order to minimize crosstalk to the lines or cables on the battery side. In addition, any sensor technology having supply line(s) to a BMC should be restricted to the consumer side, i.e. not the battery side.

This avoids interferences from the consumer side to the battery side. If filtering of low-voltage and for instance sensor cables is necessary due to high interference levels of the loads, a filter or shielding device can be effectively applied at the passage of the cables through the shielding plate 220 and thus connected at low inductance to the housing potential.

In other words, in a preferred layout, the BMC as well as any low-voltage and high-voltage connectors including any busbars and lines are arranged on the consumer side such that a complete shielding vis-á-vis the battery side can be achieved.

In order to achieve this preferred layout, the shielding plate 220 may have a suitable form which also allows for shortest possible paths of busbars and lines. The shielding plate 220 may have, other than shown in FIGS. 2a and 2b, also a rather linear shape extending between opposite sidewalls of a box-shaped integration device 20 or a shape including angles below 90°. This may result in a more compact size of the integration device 20 and higher efficiency of the shielding due to a reduced overall length of the shielding plate.

In particular, the shielding plate 220 may extend between two sidewalls of the integration device housing 23.

If the installation space in the integration device 20 is strongly limited, the input and output lines of the EMC-filter 210 are located in close proximity to each other. For instance, if a busbar arrangement is used, the lines generate conductor loops due to requirements regarding air and creeping paths as well as switching and safety elements. These conductor loops are present between the plus and minus busbars but also between the busbars and the integration device housing 23. On the side of consumer and/or charging devices, the conductor loops may cover space in the range of several 10 cm$^2$, for instance due to the dimensions of high-voltage connections, electrical fuse elements and/or high-voltage switching relays. These conductor loops couple via magnetic near fields into the battery-side connection lines in the integration device 20. This coupling tends to bridge the high-voltage EMC-filter 210, especially at higher frequencies. Thus, it is possible that the EMC-filter 210 loses its interference suppression effect. This problem is solved by the above described metallic shielding plate 220. In order to further improve the filter performance, any conductor loop(s) at the filter output 212 should be minimized as this reduces the inductive coupling into it.

The configuration as well as location of the filter device 200 within the integration device 20 increases the flexibility of the battery system 1. Battery packs 10 can be easily added or removed without the need to individually equip the battery packs 10 with filter or shielding devices and adjust the electrical properties thereof. This implies a reduction of installation space, number of components and costs. Further, the battery system 1 is easily adaptable to different types of vehicles and characteristics. The shielding plate 220 implements protection zones within the integration device 20, which ensures a high effectiveness of the EMC-filter 210. If the vehicle manufacturer already provides sufficient interference suppression, e.g. at the inverter, the filter space in the integration device 20 may remain empty.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

LIST OF REFERENCE NUMERALS

1 Battery system
10 Battery pack
11 Cell
12 Battery pack control unit
13 Battery pack output
14 Battery pack housing
20 Integration device
21 Voltage input
22 Sum voltage output
23 Integration device housing
30 Electrical component
31 Thermal conditioner
200 Filter device
210 EMC-filter
211 Filter input
212 Filter output
220 Metallic shielding plate
221 Filter bridging portion
222 Cutout
223 Distant portion
230 Conductive seal

The invention claimed is:

1. A Battery system, wherein the battery system comprises:
one or more battery packs each having one or more cells which are electrically connected and configured to provide a voltage at a respective battery pack output; and
an integration device electrically connected to the battery pack outputs and configured to receive and combine the power of the battery packs, thereby forming a sum power supplied to a sum voltage output of the integration device;
wherein the integration device comprises an integration device housing and a filter device which is configured to protect the battery packs from interferences,
wherein the filter device comprises an EMC-filter and wherein the filter device further comprises a metallic shielding plate configured to shield electromagnetic fields and which extends between two sidewalls of the integration device housing,
wherein the EMC-filter comprises at least one filter input configured to receive the sum power and at least one filter output connected to the sum voltage output, and
wherein the shielding plate comprises a filter bridging portion, wherein the filter bridging portion extends perpendicular to a filter input-filter output direction, wherein the filter bridging portion comprises a cutout in which the EMC-filter is accommodated such that one side of the filter bridging portion faces the filter input and the other side of the filter bridging portion faces the filter output, the filter bridging portion thereby bridging the EMC-filter between the filter input and the filter output in order to shield the filter input and the filter output from one another and reduce overcoupling from the filter input to the filter output.

2. The Battery system according to claim 1, wherein one or more of the battery packs are free from filters.

3. The Battery system according to claim 2, wherein no filter device is arranged within or assigned to one or more of the battery packs.

4. The Battery system according to claim 1, wherein the shielding plate is cut from one piece of a sheet metal.

5. The Battery system according to claim 4, wherein the shielding plate is mechanically connected to a base of the integration device housing.

6. The Battery system according to claim 5, wherein the filter device comprises a conductive seal configured to close at least one of: joints and gaps between the shielding plate and a component, such as at least one of: the integration device housing and the EMC-filter, and establish an electrical connection therebetween.

7. The Battery system according to claim 6, wherein the conductive seal is made of a flexible material and configured to compensate for mechanical tolerances.

8. The Battery system according to claim 7, wherein an electrical component is electrically connected to the sum voltage output of the integration device, wherein the electrical component comprises a power converter, wherein the power converter is at least one of: an inverter, a high-voltage load, and a charging device.

9. The Battery system according to claim 1, wherein the Battery system is for at least one of: a hybrid vehicle and an electric vehicle.

10. The Battery system according to claim 1, wherein the voltage provided by the one or more cells is a high voltage.

11. The Battery system according to claim 1, wherein the interferences comprise interferences generated by an electrical component connected to the sum voltage output.

12. The Battery system according to claim 2, wherein all of the the battery packs are free from high-voltage EMC-filters.

13. The Battery system according to claim 1, wherein the EMC-filter comprises a high-voltage EMC-filter.

14. The Battery system according to claim 4, wherein the sheet metal has a thickness in the range of 2 mm to 4 mm.

* * * * *